Dec. 14, 1937.  H. CLEVELAND  2,102,111
SYRINGE FOR COLD HOT WATER SUPPLY
Filed Sept. 20, 1935
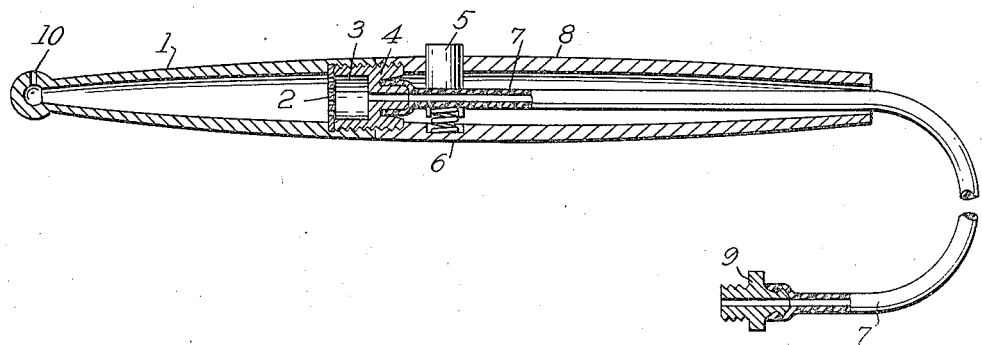
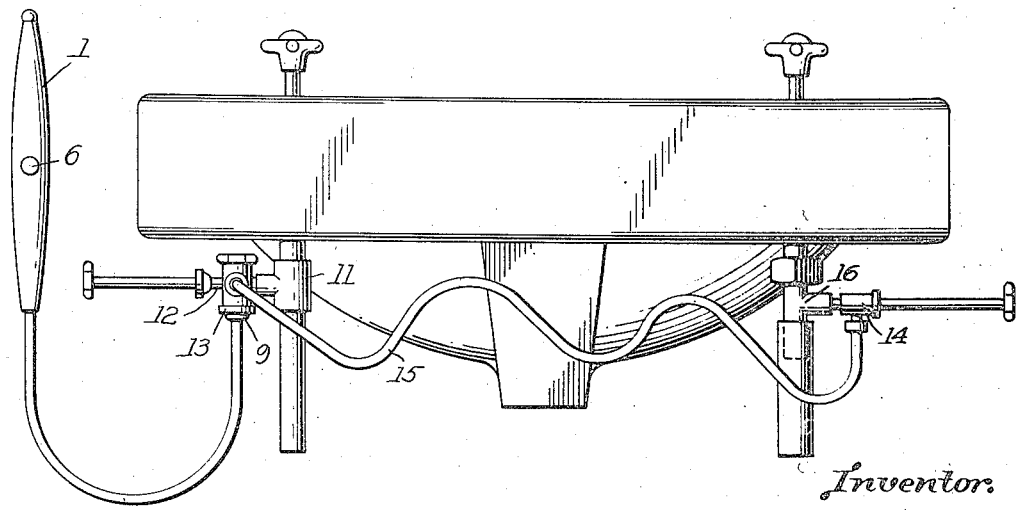
Inventor:
HENRY CLEVELAND
Attorney.

Patented Dec. 14, 1937

2,102,111

UNITED STATES PATENT OFFICE 2,102,111

SYRINGE FOR COLD-HOT WATER SUPPLY

Henry Cleveland, Munksnas, Helsingfors, Finland

Application September 20, 1935, Serial No. 41,487
In Finland August 27, 1934

1 Claim. (Cl. 128—229)

The syringes hitherto known for washing of the teeth and the cavity of the mouth by means of water under pressure of the water supply have not been of any practical use in consequence of the difficulties arising when fitting said syringes; the reason being that the outlets of the hot-cold water supply or the seats of the plug or tap, vary in respect to form as well as to distance from each other, which therefore necessitates a detailed and expensive installation. Moreover, when connecting to the plug or tap, a tight connection hardly can be obtained.

The known tooth-syringes further have the disadvantage of having a separate receptacle for supplying the water for rinsing with antiseptics, which provision makes the syringes expensive and complicated that when adding new antiseptic, it necessitates a great number of different tightening and unscrewing grips.

The present invention provides an improved syringe which avoids all these disadvantages and which can be attached to any hot-and-cold-water conduit having standard pipes. It has heretofore been practice with generally all water conduits to connect the inlet of the taps at the washing-basins or the like with the water conduit pipes by means of a standard-modelled coupling-box. According to the present invention, this arrangement is made use of for connecting the syringe except that said coupling-boxes are substituted by T-pipes having corresponding threads, of which latter pipes one is placed in each water conduit pipe. Each T-pipe is provided with a regulating device wherein one, preferably the one connected to the cold-water-piping, opens into a mixing-chamber with a back pressure valve, which by means of flexible piping is connected with the outlet of the other regulating device. The flexible piping, the length of which is more than the usual distance between the inlets of the taps at the washing-basins, is wound to form a spiral or curved structure in such a way that it always can be adapted any distance irrespective of the differences to be found in this respect. To the outlet of the valve provided with the mixing-chamber, the tube of the syringe is attached.

According to the present invention, the improved syringe is made like a pencil with an end substantially globular which end may be provided with one or, if so desired, more holes for the passing of the jets of water. Owing to such globular formation, the jets of water may be given practically every direction desired, and when using several holes discharging water in various directions, the whole mouth can be cleaned and massaged at the same time, while every risk of injuring is excluded. The tooth-syringe is equipped with a shutting means operated preferably by finger-pressure, and an excavation which excavation is provided either wholly in the removable end or partly therein and partly in the shaft of the syringe and comprises a receptacle for a suitable, water-soluble antiseptic or the like, which will gradually be dissolved and be carried along with the water. This arrangement makes the adding of new antiseptic very simple and effective. The receptacle for the antiseptic may even be divided into two separate spaces, viz. a dissolving-space where the substance is dissolved, and a mixing-space, where the solution is mixed carefully. The separation of the spaces may be effected by a grating or spray-nozzle plate, and the mixing-space, may, if so desired, have guide blades in order to obtain a good whirl-effect.

One form for carrying out the present invention is represented in the accompanying drawing, according to which Figure 1 shows one of the usual ways for connecting hot-and-cold-water conduits with standard-dimensioned pipes to the taps at a washing-basin with a tooth-syringe according to the invention attached, while Figure 2 shows the nozzle of the tooth-syringe on enlarged scale.

In the drawing, 1 indicates a conical, excavated nozzle, screwed on an intermediate portion 4, which latter is screw-threaded on a handle 8. A tube 7, preferably made of rubber is fixed to the intermediate portion 4, and extends through the nozzle-handle 8. The nozzle 1, the intermediate portion 4 and the handle 8 form a pencil-shaped syringe with a passage extending from one end to the other and opening into the end of the nozzle 1, which latter end is substantially globular and provided with one or more narrow exhaust-holes 10. The handle 8 has a shutting arrangement 5, 6, which when handling the handle, is adapted to be opened or closed by pressure of the finger. By means of said shutting arrangement the water-supply is put on or off, and by said means the operator can regulate the water pressure. The receptacle adapted for the antiseptic is formed partly by the excavation in the proper nozzle 1 and partly by the excavation 3 in the intermediate portion 4. One end of the tube for the tooth-syringe is fixed to the intermediate portion 4 of the syringe, and the other end is secured to a nut 9 adapted for connecting to the regulating device 12, which device is provided with a mixing-chamber 13 and a back pressure valve. Said device is screwed on the T-pipe 11 substituting the usual coupling-box at the connection with the cold-water tap. The usual coupling-box at the connection with the hot-water tap is replaced by the T-pipe 16, and on said pipe another regulating device 14 is screwed, this device, however, having neither mixing-chamber nor back pressure valve. Between this last-named device and the back pressure valve in the device 12, there is arranged the flexible connecting pipe 15 wound to form a spiral or curved-like structure which makes it possible to connect the devices at varying distances from each other.

When the regulating device 12 is opened, cold water runs through the tooth-syringe, and by opening the regulating device 14, hot water is added, the quantity being regulated as required. In the chamber 13, the hot and cold water mix so that a uniform quantity of water with the temperature desired enters the receptacle for the antiseptic of the tooth-syringe, which receptacle is divided by a grating 2 or the like into a dissolving-space and a mixing-space, and from which said quantity of water, mixed with the antiseptic, flows through the opening or openings in the globular end of the syringe.

The details of the invention, such as the shape of the regulating devices, may be modified. The tooth-syringe may also be used for other similar purposes, e. g. for the rinsing of or medical attendance to diseases in cavities of the human body in general, and for this purpose it is provided with an end suitable for the special object in question. In the same manner, one can for the purpose of shampooing use a lid perforated by many holes instead of the proper end, while the receptacle is filled with shampoo-powder. When desired, said end may even be replaced by a perforated tooth-brush.

What I claim and desire to secure by Letters Patent is:

In a syringe construction for cold and hot water supply systems, two T-coupling devices adapted to be permanently connected, the one with the cold water supply line, the other with the hot water supply line, a water supply regulator connected with each of said T-coupling devices, a mixing chamber adjacent to and connected with one of said water supply regulators, an extendible flexible piping connection between said mixing chamber and the other water supply regulator, in the connection between the water supply regulators, a back pressure valve adapted to prevent water of higher pressure from entering the water line system of lower pressure, and a syringe detachably connected with the mixing chamber and having a pencil-like nozzle with exchangeable ends, a shutting arrangement in said nozzle operated by finger-pressure, and after said shutting arrangement in the direction of the flow of water a receptacle for an antiseptic consisting of an excavation in said nozzle and divided into two spaces, namely a dissolving-space and a mixing-space, situated at the front thereof and provided with guide blades adapted to create a whirling effect.

HENRY CLEVELAND.